(12) United States Patent
Petersson et al.

(10) Patent No.: US 11,254,086 B2
(45) Date of Patent: Feb. 22, 2022

(54) PACKAGING MATERIAL FOR PACKAGING OF LIGHT-SENSITIVE GOODS AND METHOD FOR PRODUCING SAID PACKAGING MATERIAL

(71) Applicant: Tetra Laval Holdings & Finance S.A., Pully (CH)

(72) Inventors: Marcus Petersson, Gothenburg (SE); Joakim Balogh, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 284 days.

(21) Appl. No.: 15/752,134

(22) PCT Filed: Aug. 4, 2016

(86) PCT No.: PCT/EP2016/068689
§ 371 (c)(1),
(2) Date: Feb. 12, 2018

(87) PCT Pub. No.: WO2017/025442
PCT Pub. Date: Feb. 16, 2017

(65) Prior Publication Data
US 2018/0237194 A1    Aug. 23, 2018

(30) Foreign Application Priority Data

Aug. 12, 2015  (EP) ..................... 15180810

(51) Int. Cl.
*B65D 65/40*    (2006.01)
*B32B 1/02*    (2006.01)
(Continued)

(52) U.S. Cl.
CPC ............... *B32B 3/266* (2013.01); *B32B 1/02* (2013.01); *B32B 1/04* (2013.01); *B32B 3/02* (2013.01);
(Continued)

(58) Field of Classification Search
CPC .......... B65D 65/40; B65D 65/42; B65D 5/74; B65D 5/563; B32B 3/02; B32B 3/266;
(Continued)

(56) References Cited

U.S. PATENT DOCUMENTS 6,582,787 B1    6/2003    Kawai et al.
7,520,959 B2    4/2009    Kikuchi
(Continued)

FOREIGN PATENT DOCUMENTS

CN    2799457 Y    7/2006
CN    201128562 Y    10/2008
(Continued)

OTHER PUBLICATIONS

PubChem ("Titanium Dioxide", PubChem, https://pubchem.ncbi.nlm.nih.gov/compound/Titanium-dioxide p. 1-102, accesed Mar. 9, 2020). (Year: 2020).*

(Continued)

*Primary Examiner* — Walter Aughenbaugh
(74) *Attorney, Agent, or Firm* — Knobbe, Martens, Olson & Bear, LLP

(57) ABSTRACT

A packaging material for packaging of light-sensitive goods, said packaging material comprising a first layer and a second layer, at least one hole penetrating said first layer and being covered by said second layer, and a light barrier, wherein said light barrier comprises a layer of ink being essentially nontransparent to light and provided on said second layer to at least partly cover said hole. The disclosure further relates to a method for providing a light barrier covering a hole in a packaging material as well as to a package for packaging of light-sensitive goods.

17 Claims, 1 Drawing Sheet

(51) Int. Cl.
  *B32B 3/26* (2006.01)
  *B32B 27/10* (2006.01)
  *B32B 27/32* (2006.01)
  *B32B 1/04* (2006.01)
  *B65D 5/56* (2006.01)
  *B32B 3/02* (2006.01)
  *B65D 5/74* (2006.01)
  *B65D 65/42* (2006.01)
  *C09D 11/324* (2014.01)

(52) U.S. Cl.
  CPC .............. *B32B 27/10* (2013.01); *B32B 27/32* (2013.01); *B65D 5/563* (2013.01); *B65D 5/74* (2013.01); *B65D 65/40* (2013.01); *B65D 65/42* (2013.01); *B32B 2255/10* (2013.01); *B32B 2255/24* (2013.01); *B32B 2307/4023* (2013.01); *B32B 2307/41* (2013.01); *B32B 2307/72* (2013.01); *B32B 2307/738* (2013.01); *B32B 2313/04* (2013.01); *B32B 2323/046* (2013.01); *B32B 2435/02* (2013.01); *B32B 2439/40* (2013.01); *B32B 2439/62* (2013.01); *B32B 2439/70* (2013.01); *B65D 2565/387* (2013.01); *C09D 11/324* (2013.01); *Y02W 30/80* (2015.05)

(58) Field of Classification Search
  CPC .. B32B 1/04; B32B 1/02; B32B 27/32; B32B 27/10; B32B 2255/10; B32B 2435/02; B32B 2565/387; B32B 2439/40; B32B 2255/24; B32B 2439/70; B32B 2439/62; B32B 2323/046; B32B 2313/04; B32B 2307/738; B32B 2307/72; B32B 2307/4023; B32B 2307/41; B32B 3/26; Y02W 30/806; C09D 11/324

USPC ........................................................ 428/35.7
See application file for complete search history.

(56) References Cited

U.S. PATENT DOCUMENTS

2003/0190441 A1* 10/2003 Takahashi ................ B65D 5/72
                                                               428/34.2
2005/0252627 A1* 11/2005 Kikuchi .................. B32B 29/00
                                                               162/134

FOREIGN PATENT DOCUMENTS

| CN | 104559475 A | 4/2015 | |
| CN | 104629532 A | 5/2015 | |
| EP | 0600502 | 6/1994 | |
| EP | 2374610 A1 | 10/2011 | |
| JP | 10129740 A | * 5/1998 | ............ B65D 81/30 |
| JP | 2004-066769 A | 3/2004 | |
| JP | 2009-544495 A | 12/2009 | |
| JP | 2010-036538 A | 2/2010 | |
| JP | 4424645 B | 3/2010 | |
| JP | 2011157078 | 8/2011 | |
| JP | 2012-030843 A | 2/2012 | |
| JP | 2015120870 A | 7/2015 | |

OTHER PUBLICATIONS

Kunio, etl al., JP10129740A (Machine Translation), p. 1-8, 1998.*
Extended European Search Report for European Application No. 15180810.2 dated Jan. 25, 2016 in 5 pages.
International Search Report and Written Opinion for International Application No. PCT/EP2016/068689 dated Sep. 2, 2016 in 8 pages.

* cited by examiner

PACKAGING MATERIAL FOR PACKAGING OF LIGHT-SENSITIVE GOODS AND METHOD FOR PRODUCING SAID PACKAGING MATERIAL

TECHNICAL FIELD OF THE INVENTION

The present invention relates to a packing material, wherein said packaging material has a hole provided with a light barrier, and to a method for producing said packaging material.

BACKGROUND OF THE INVENTION

It is well known that the degradation of food and beverages is promoted by exposure to light and/or to oxygen. Such degradation may lead to changes in flavour, colour changes as well as degradation of nutrients. Furthermore, oxygen may be activated by light, which may lead to a faster deterioration of the food or beverage. Light accelerates the reactions with oxygen, present inside the package filled with a food product, which degrade taste and nutritional components.

Thus, packaging materials for food or beverages need to protect the contents from e.g. light and oxygen in order to ensure a long shelf life without deterioration of the quality of the contents of the package.

Conventional packages comprise a metal foil, usually aluminium foil, as a light and oxygen barrier. In the case were the package has a hole, e.g. a straw hole, the aluminium foil covers the hole. Aluminium is a rather expensive packaging material. Therefore, packaging materials which do not comprise aluminium foil (non-foil packaging materials) have been developed. Such packaging materials most often comprise several layers of different materials, such as paper or carton based material and several different polymer layers, each layer contributing to the properties of the packaging material. In such a packaging material, the paper or carton based material contributes to the light barrier properties of the material.

A hole is used in different applications, e.g. in packages for ready-to-drink beverages, wherein the hole may be a hole for inserting e.g. a straw. In such a package, a hole is provided in one or more of the layers of the packaging material and at least one of the remaining layers of the packaging material covers the hole. The layers covering the hole can easily be penetrated by the straw and the beverage can be drunk through the straw. However, in packages made of a packaging material without aluminium foil, the light barrier of the packages at the site of the hole is compromised since the carton layer often does not extend over the hole.

Also in packages made of a packaging material having a metal foil, the light barrier of the packages at the site of the hole may be compromised if both the carton layer and the metal layer are removed from the area of the hole. It is also possible that the packaging material has no carton layer but still a metal layer, which is, however, removed from the area of the hole. Such a hole thus enables light irradiation to reach the filled product in the package, if the remaining layers of the laminated material in the area of the hole do not block the light.

In small packages intended to be used for single portions of cream or milk which can be added to e.g. a cup of coffee or tea, the hole is covered by a cover, such as a tab, usually made of aluminium, which is removed in order to open the package. In order to fully protect the contents of such a package, the tab needs to encompass a light barrier, since such packages usually have a long shelf-life and are often stored in light places.

In other packages, such as on-the-go packages and packages for larger amounts, such as 0.1-4.5 L, typically 0.25-1.5 L, of e.g. milk or fruit juices, the hole is cover by a top, such as a screw top, or a cap. However, in packages made of a packaging material without aluminium foil, the light barrier of the packages at the site of the hole is compromised since the carton layer often does not extend over the hole and since the light barrier properties of the top or cap is not as good as the light barrier properties of the carton material itself.

Packaging materials for food packages are often complicated materials and the packaging of food in general is complicated for health reasons. Thus, when applying a light barrier for a hole, it is i.e. important to ensure that the quality of the food package stays intact so as not to compromise the expiration date of the food or beverage in the package. Furthermore, it is important to ensure that the light barrier itself does not affect the quality of the food product.

As food packages are mostly mass produced, the problem arises to achieve packaging materials not comprising aluminium foil and having a light barrier for a hole. Preferably, the resulting packaging material is inexpensive enough to be used in mass production and can be converted to a package using conventional equipment.

SUMMARY OF THE INVENTION

It is an object of the present invention to improve the current state of the art, to solve problems of the prior art, and to provide a packaging material for packaging of light-sensitive goods. According to a first aspect of the invention, the above and other objects of the invention are achieved, in full or at least in part, by a packaging material as defined by claim 1. According to this claim the above object is achieved by a packaging material for packaging of light-sensitive goods, said packaging material comprising a first layer and a second layer, at least one hole penetrating said first layer and being covered by said second layer, and a light barrier, wherein said light barrier comprises a layer of ink being essentially nontransparent to light and provided on said second layer to at least partly cover said hole.

The light barrier has a light barrier property which prevents transmission of light.

The light barrier may at least partly shield light from passing, thereby reducing the transmission of a portion of incident light.

The light may be visible or non-visible to the human eye.

The at least one layer of ink may cover the entire hole in order to restore the light barrier.

The at least one layer of ink may cover a bigger surface than the hole itself.

In a package made from the above packaging material and containing a beverage intended to be drunk through a straw, the at least one layer of ink together with the second layer of the packaging material may easily be penetrated by the straw.

According to one embodiment of the invention, the packaging material may comprise an inner side facing an inner package environment, and an outer side facing an outer package environment, and said layer of ink may be provided on said outer side.

According to an embodiment of the invention, the at least one layer of ink may comprise carbon black. Carbon black is a form of paracrystalline carbon that has a high surface-area-to-volume ratio and which, when applied to a surface renders the surface essentially nontransparent to light. This is especially advantageous, since a light barrier comprising carbon black will essentially restore the light barrier of the hole. Carbon black from vegetable origin is approved as a food colouring in Europe and is known as additive E153.

According to another embodiment, the at least one layer of ink may comprise titanium dioxide. Titanium dioxide ($TiO_2$) is also known as titanium(IV) oxide or titania. Titanium dioxide, when applied to a surface renders the surface essentially nontransparent to light. This is especially advantageous, since a light barrier comprising titanium dioxide will essentially restore the light barrier of the hole. Titanium oxide is used in a wide range of applications, from paint to sunscreen to food colouring (E171).

According to yet another embodiment, the at least one layer of ink may comprise carbon black and titanium dioxide. The proportions of carbon black and titanium dioxide may be varied in order to achieve an optimal light barrier which does not transmit light. In addition, such a mixture may be chosen so that the colour of the mixture resembles aluminium foil.

The light barrier may be tailored to have desired properties regarding light transmission by choosing different ratios (weight:weight) of carbon black to titanium dioxide. This is advantageous since the demands on the light barrier differ for different packaging materials depending on i.a. the product to be packaged, the shelf-life of the product and the storage conditions.

The ratio (weight:weight) of carbon black to titanium dioxide may be between 1:3 to 1:2000. A larger amount of carbon black gives a light barrier which transmits less light than a light barrier comprising less amounts of carbon black.

The ratio (weight:weight) of carbon black to titanium dioxide may be between 1:10 to 1:200, preferably 1:15 to 1:50.

The ratio (weight:weight) of carbon black to titanium dioxide may be between 1:10 to 1:15. This ratio may be used in a packaging material used for extremely light-sensitive products.

The ratio (weight:weight) of carbon black to titanium dioxide may be between 1:50 to 1:200. This ratio may be used in a packaging material used for less light-sensitive products, such as soft drinks, or products with shorter shelf-life or products which have a less light-exposed distribution chain.

Furthermore, the mixture may comprise other additives such as binders, fillers, surfactants, emulsifiers, adhesion improving additives, surface improving additives and additives which improve the wear resistance of the mixture.

The at least one layer of ink may be tinted so that the light barrier has a different colour than the black, white or gray which is achieved by carbon black and titanium dioxide.

According to another embodiment, the at least one layer of ink may be at least 0.2 µm thick. Preferably, the at least one layer of ink may be at least 1 µm thick. The at least one layer of ink may be between 0.2-12 µm thick. Preferably, the at least one layer of ink is between 1-3 µm thick.

The at least one layer of ink may have the same or smaller thickness as the first layer of the packaging material, thus not protruding over the surface of the resulting package.

According to another embodiment, the packaging material may comprise at least two layers of ink.

The second layer of ink may be a protective layer. The protective layer may be applied in order to protect the first layer of ink from e.g. being scratched off. The protective layer may be polyethylene.

The second layer may be tinted, so that the light barrier has a different colour than the black, white or gray which is achieved by carbon black and titanium dioxide.

According to a second aspect of the present invention, a method for providing a light barrier in a packaging material is also provided, said packaging material comprising a first layer and a second layer, and at least one hole penetrating said first layer and being covered by said second layer, wherein the method comprises the step of applying a layer of ink on said second layer to at least partly cover said hole, said layer of ink being essentially non-transparent to light.

The layer of ink may be applied by an inkjet.
The layer of ink may be applied by spray coating.
The layer of ink may be applied by a spraying technique.
The layer of ink may be applied by a printing technique.
The layer of ink may be applied by a flexo printing technique.
The layer of ink may be applied by a selective deposition technique.
The ink may be an ink spray.
The ink may be a liquid ink.
The ink may be a tinted hotmelt.
The ink may be a tinted paste.

The first layer of ink may be applied to the packaging material when the package is filled with its contents, i.e. in a filling machine or downstream the filling process. It may be an advantage to coordinate with an inkjet printer for printing date and batch number on the packages, such printersin some cases being used in connection with the filling processes today.

The first layer of ink may according to another embodiment be applied to the packaging material during the production of the packaging material itself. For example, the first layer of ink may be applied during the lamination of the packaging material. In this way, the first layer of ink may be applied before a polymer layer, which is commonly used as the outermost layer of a packaging material, is applied. Thus, the first layer of ink may be protected by a polymer layer, such as a thermoplastic polymer layer. A further advantage of applying the ink layer within or downstream the packaging material manufacturing process, is, that good control of the light barrier quality may be ascertained at the manufacturing site.

Alternatively, the first layer of ink may be applied during the slitting, doctoring or finishing steps, of the process for manufacturing of the packaging material. An advantage of this embodiment is that it is easy to implement by using conventional equipment downstream of the lamination operation. The advantage of applying the ink layer within or downstream the packaging material manufacturing process is, that good control of the light barrier quality may be ascertained.

According to one embodiment, the method may further comprise the step of applying a second layer of ink on said layer of ink. By applying a second layer of ink the light transparency of the light barrier may be adjusted.

The second layer of ink may be applied to the packaging material when the package is filled with its contents, i.e. in a filling machine. This is advantageous, since inkjets for printing date and batch number on the package are present in the filling machines used today.

The second layer of ink may be applied to the packaging material during the production of the packaging material itself. For example, the second layer of ink may be applied during the lamination of the packaging material.

Alternatively, the second layer of ink may be applied downstream of the lamination stations, during the slitting, doctoring or finishing of the packaging material.

According to another embodiment, the at least one of said layers of ink may comprise carbon black and/or titanium dioxide.

At least one of said layers of ink may comprise carbon black.

At least one of said layers of ink may comprise titanium dioxide.

At least one of said layers of ink may comprise carbon black and titanium dioxide.

The ratio (weight:weight) of carbon black to titanium dioxide may be between 1:15 to 1:50.

At least one layer of ink may be tinted.

According to yet another embodiment, at least one of said layers of ink may be applied in a thickness of at least 0.2 µm, preferably at least 1 µm. The thickness of at least one of said layers of ink may be between 0.2 and 12 µm thick, preferably between 1 and 3 µm thick.

According to another embodiment, at least one of said layers of ink may be applied before or after the packaging material is processed into a package.

According to another embodiment, at least one of said layers of ink may be applied before or after the package is filled. One advantage of applying said layers of ink before the package is filled is that the layer(s) of ink may then be covered, and thus protected, by a polymer layer, such as a polyolefin layer, which is commonly used as the outermost layer of a packaging material. One advantage of applying said layers of ink after the package is filled is that the layer(s) of ink will not be in contact with the inner surface of the packaging material, which may be the case when the layer(s) of ink have been applied during the production of the packaging material before it is rolled into rolls where the outside of the material for one package faces the inside of the material for another package.

The first and second layer of ink may be applied to the packaging material at different stages of the production of the packaging material or of the package. For example, the first layer may be applied during the lamination of the packaging material and the second layer may be applied to the packaging material after lamination, if the second step is only used for some products. In this way, the second layer may be coloured, both for lightbarrier properties and for differentiation purposes. This will allow for the light barrier to have different strength for different packages, making it possible to taylor the need of barrier properties to a specific product/use. It will also make it possible to have different colour. This will also help to distinguish different products from each other by the colour of the light barrier. The advantage of applying the ink layers within or downstream the packaging material manufacturing process is, that good control of the light barrier quality may be ascertained. The second ink application step can alternatively be done in the filling process (after the package is filled), but means that full quality control needs to be ascertained by the filling site.

A cover tab or cover patch may be applied to at least one of said layers of ink. When the tab is removed, the layer(s) of ink and the underlying layers of the packaging material are removed from the hole and the contents of the package can be accessed.

The tab may be covered by a light barrier comprising at least on layer of ink being essentially nontransparent to light. The at least one layer of ink may comprise carbon black and/or titanium dioxide.

According to a third aspect of the present invention, a package for packaging of light-sensitive goods is provided, wherein said package comprises a packaging material according to the present invention.

An advantage is that light sensitive goods, such as e.g. milk may be packaged in such a package. Milk is sensitive to light and milk that is subjected to e.g. intense sunlight may get a different flavour. Thus, a package according to the present invention will protect the content from light and the resulting deterioration and changes in flavour.

In addition, the package provided with a light barrier according to the present invention will also protect the contents of the package from light-activated oxygen. This may be advantageous for packaging goods that are sensitive to activated oxygen. Examples of such goods are milk and products comprising antioxidants, such as drinks from fruit, berries and vegetables.

The hole may be a straw hole.

According to a fourth aspect of the present invention, a light barrier covering a hole in a packaging material is provided, wherein said packaging material comprises at least a first layer and a second layer, wherein said hole penetrates said first layer, wherein said packaging material has an inner side facing an inner package environment and an outer side facing an outer package environment, wherein said hole is covered by at least said second layer of the packaging material, wherein said light barrier comprises at least one layer of ink on at least a part of said second layer of the packaging material, wherein said one layer of ink at least partly covers said hole, and wherein said one layer of ink is essentially nontransperent to light.

According to fifth aspect of the present invention, a use of an ink comprising carbon black and/or titanium dioxide as a light barrier for covering a hole in a packaging material is provided, wherein said packaging material comprises at least a first layer and a second layer, wherein said hole penetrates said first layer, wherein said packaging material has an inner side facing an inner package environment and an outer side facing an outer package environment, wherein said hole is covered by at least said second layer of the packaging material, wherein said ink is applied on at least part of said second layer of the packaging material and wherein said ink at least partly covers said hole.

Thus, when a packaging material has a hole, within the area of which all light barrier materials have been removed, the packaging material and any resulting packages therefrom, may benefit from this invention by obtaining improved light barrier properties altogether.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [layer, step, etc.]" are to be interpreted openly as referring to at least one instance of said layer, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

As used here in "essentially nontransparent" is intended to mean that at least 90% of incoming light is not transmitted through the material.

As used herein, the term "light barrier property" corresponds to any physical characteristic of a material to significantly reduce transmission of a portion of incident light of one or more wavelengths. Examples of this physical charateristic can be, but is not excluded to, absorption, reflection and scattering, as well as combinations of two or more.

All materials have a wavelength-dependent transmission or absorption coefficient.

As used herein, a "light barrier" can be described as a material having a light barrier property. A "light barrier" can also be described as a material having a very high opacity. A light barrier at least partly shields light from passing, thereby reducing the transmission of a portion of incident light.

BRIEF DESCRIPTION OF THE DRAWINGS

In the following the present invention will be described in greater detail together with the accompanying drawings, in which.

DETAILED DESCRIPTION OF PREFERRED EMBODIMENTS OF THE INVENTION

The invention relates to a packaging material 1 for packaging of light-sensitive goods. The packaging material 1 has at least one hole 4 covered by a light barrier.

Three different embodiments are shown in the figures. In all of them, a light barrier comprising at least one layer of ink 5 is applied over a hole 4 in a packaging material 1.

Figure 1:
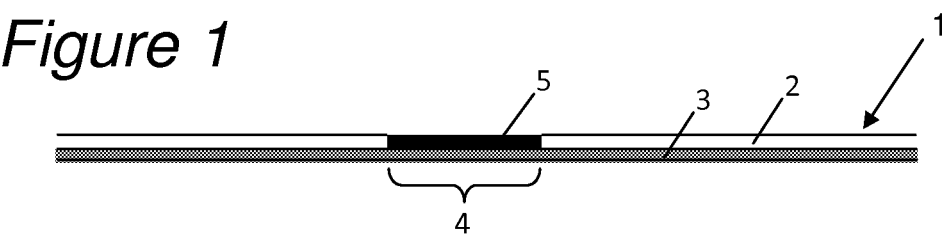
FIG. 1 shows a schematic drawing of a cross-sectional view of a first embodiment of the present invention having a hole in a packaging material, wherein the hole is covered by a light barrier comprising a first layer of ink.

FIG. 1 shows a schematic drawing of a cross-sectional view of a first embodiment of the present invention. The packaging material 1 comprises at least two layers 2, 3. The packaging material may comprise additional layers. The hole 4 penetrates at least the first layer 2. The second layer 3 covers the hole. The light barrier comprises one layer of ink 5 and is applied on the second layer 3 and covers the hole 4.

Figure 2:
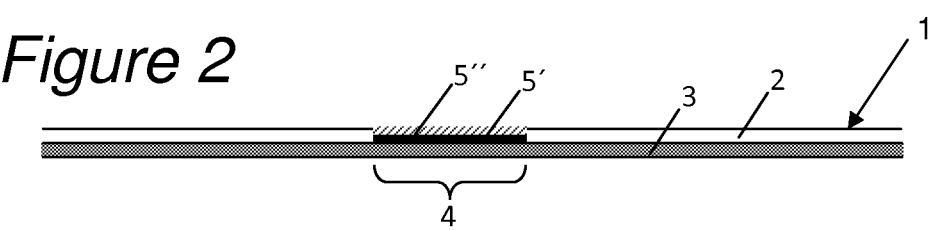
FIG. 2 shows a schematic drawing of a cross-sectional view of a second embodiment of the present invention having a hole in a packaging material, wherein the hole is covered by a light barrier comprising a first and a second layer of ink.

FIG. 2 shows a schematic drawing of a cross-sectional view of a second embodiment of the present invention. The packaging material 1 comprises at least two layers 2, 3. The packaging material may comprise additional layers. The hole 4 penetrates at least the first layer 2. The second layer 3 covers the hole. The light barrier comprises two layers of ink 5", 5" and is applied on the second layer 3 and covers the hole 4.

In one embodiment a further layer of polymer is applied on top of the hole, i.e. on top of the first layer 2, and within the hole region on top of the second layer 3, and the light barrier is printed on top of this further layer.

The ink comprises carbon black and/or titanium dioxide. When applied in a stuffiest thickness, typically between 0.2 and 12 μm, preferably between 1 and 3 μm, both these substances will provide a light barrier which will transmit essentially no light, i.e. have a high opacity.

Figure 3:
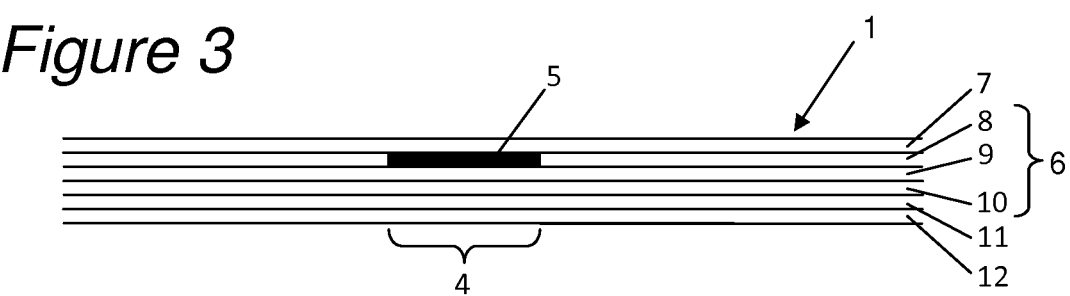
FIG. 3 shows a cross-sectional view of a third embodiment of the present invention having a hole in a packing material, wherein the hole is covered by a light barrier comprising a layer of ink.
Figure 4:
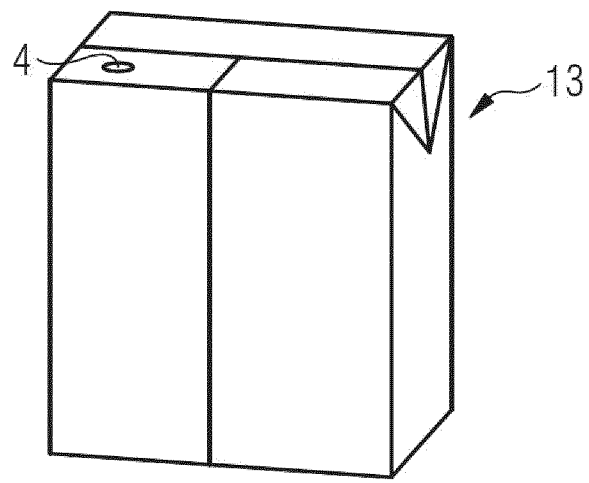
FIG. 4 is a perspective view of a package according to the invention with the hole visible.

FIG. 3 shows a cross-sectional view of a third embodiment of the present invention. In short, the packaging material 1 comprises a bulk laminate 6, which in this embodiment has three main layers, i.e. layers 8, 9 and 10. An outer adhesive layer (not shown) connects the carton based layer 8 to an outer laminate layer 7, also called a décor layer. In certain embodiments, more than one outer laminate layer 7 is present on the packaging material 1. Various printing may be arranged on the outer surface of the carton based layer 8 and protected by décor layer 7. The carton layer 8 contributes to the light barrier properties of the packaging material 1. On an inner side of the carton layer 8 a bonding layer 9 is arranged. The bonding layer 9 Is an intermediate layer, which binds the carton layer 8 to further layers on the inside of the carton layer. Examples of materials used in the different layers 7, 8 and 9 are described below.

In one embodiment, the outer heat sealable polymer layer 7 is beneath the printed ink-light barrier 5, i.e. the light barrier ink is printed on finished packaging laminate, e.g. in the filling machine or in the slitter.

The hole may be covered by polymer layers on both sides of the packaging material.

A thin adhesive layer (not shown) may connect the bonding layer 9 with a further layer 10, having barrier properties. Such an adhesive layer prevents de-lamination between the barrier layer 10 from the bonding layer 9. The layer 10 may be a layer having light barrier properties, and/or a layer having a gas-tight property, i.e. preventing light and/or gas, particularly oxygen, from diffusing through the bulk laminate 6.

In one embodiment, layer 10 comprises a tinted polymer layer. The polymer may be e.g. PE, LDPE or variants thereof, HDPE, PP, PET, EVOH or polyamide. Notable gas barrier properties are obtained by the choice of a polymer providing gas barrier properties, such as ethylene vinylalcohol copolymers, EVOH, or polyamides.

For providing barrier properties, the layer 10 may alternatively be a polymer film that has been coated with a material providing the barrier properties, such as a metallisation coating (for providing mainly light barrier properties) or a different vapour deposition coating, such as e.g. an organic oxides coated by PECVD, plasma enhanced chemical vapour deposition coating, or the like. A further suitable gas barrier coating would be a dispersion-coated polymer composition, such as a polyvinyl alcohol (PVOH) or polysaccharide composition, optionally further containing an inorganic filler compound.

Alternatively, poly-ethylene, polypropylene or copolymers of ethylene or propylene, such as, for example, ethylene-propylene, ethylene-butene, ethylene-hexene, ethylene-alkyl(meth-acrylate or ethylene-vinyl acetate copolymers, or PET (polyethylene terephthalate) can be used. The tinting may be the same carbon black and $TiO_2$ as described above. The tinting may be other pigments. Layer 10 may be a tinted polymer layer in packaging materials wherein the light barrier provided by the paper board is not sufficient to reduce the transmission of light to a predetermined level.

In one embodiment, instead, or also, layer 9 comprises a tinted polymer layer. The tinting may be the same carbon black and $TiO_2$ as described above. The tinting may be other pigments. Layer 9 may be a tinted polymer layer in packaging materials wherein the light barrier provided by the paper board is not enough to reduce the transmission of light to a predetermined level.

One or more plastic laminate layer(s) are arranged on a second side of the bulk laminate 6, opposite the first side, forming an inner side of the packaging material 1 and called inner plastic laminate layer(s) or sealing layer(s) 11, 12. In one embodiment, at least one plastic laminate layer forms a gas and/or liquid barrier.

In one embodiment, two more heat sealable laminate layers 11 and 12, respectively, are arranged on the inner side of a non-foil gas barrier layer 10. Thus, together, these layers provide liquid- and gas-tight properties. As layer 12 is in contact with liquid and particularly liquid food, such a layer should be food-approved and fulfil the requirements of food safety regulations. The free surface of layer 12 corresponds to the inner surface of the packaging material 1.

As illustrated in FIG. 3, a hole 4 is provided in the packaging material 1. The hole 4 penetrates at least the carton layer 8. The other layers 9, 10, 11 and 12 cover the hole (4). However, since the carton layer does not extend over the hole, the light barrier of the packaging material 1 at the site of the hole 4 is compromised. In the case of a package made from the packaging material 1 and containing a beverage intended to be drunk through a straw, these layers can easily be penetrated by the straw. The hole 4 is provided with a light barrier comprising at least one layer of ink 5 on at least part of the bonding layer 9 of the packaging material 1. Preferably the layer of ink 5 covers the entire hole 4 in order to restore the light barrier. The layer of ink 5 is essentially nontransparent to light. In this specific embodiment, the décor layer 7 covers the applied light barrier.

The hole 4 can be provided by milling, drilling, burning, cutting, punching or other techniques applicable for providing a hole in a packaging material.

The packing material is preferably a multi layer material comprising:
a bulk laminate 6 having a light barrier property;
at least one outer plastic laminate layer (also called a décor layer) 7 arranged on a first side of the bulk laminate 6 forming an outer side of the packaging material 1;
at least one inner plastic laminate layer 11, 12 arranged on a second side the bulk laminate 6, opposite the first side forming an inner side of the packaging material 1.

Preferably the light barrier comprising a layer of ink 5 is applied on the outside side of the packaging material 1, thus replacing at least the carton layer 8.

The packaging material 1 may be formed into a package 13 containing a product.

The bulk laminate 6 has a light barrier property or in other words a high opacity. The term light barrier property may correspond to any physical characteristic of the bulk laminate 6 to significantly reduce the transmission of a portion of incident light of one or more wavelengths. All materials have a wavelength-dependent transmission or absorption coefficient. Consequently, the bulk laminate 6 may comprise materials for which the absorption coefficients for the one or more defined wavelengths are very high.

Such light absorption properties can be achieved by the selection of a suitable material as described below. As the transmission rate of light is also a function of thickness of the material, higher thickness can reduce transmission and increase absorption. In addition, the material may influence the scattering and reflection of light.

For instance, the bulk laminate 6 may comprise a carton layer 8, i.e. a paper or carton based material of a certain thickness. Such a material may at least partly shield light from passing, thereby reducing the transmission of a portion of incident light. The paper or base material, also called paper- or carton board, used according to the present invention comprises a grammage between 60-480 g/m$^2$, depending on the requirement for different types of packages. The grammage of the paperboard is assessed in accordance with ISO 536. Grammage expresses weight per unit area and is measured in g/m$^2$. The paper or paperboard normally has a thickness between 50-660 µm, particular between 90-110 µm or 200-500 µm, such as 250-350 µm and is appropriately selected in order to obtain the desired stiffness suitable for the type of packaging container. The paper- or carton board normally has a density higher than 400 kg/m$^3$, such as higher than 500 kg/m$^3$, such as higher than 600 kg/m$^3$.

However, the bulk laminate 6 of the packaging material 1 may also comprise a polyolefin bulk layer, made e.g. of poly-ethylene, polypropylene or copolymers of ethylene or propylene, such as, for example, ethylene-propylene, ethylene-butene, ethylene-hexene, ethylene-alkyl(meth-acrylate or ethylene-vinyl acetate copolymers, or PET (polyethylene terephthalate) bulk layer.

In some embodiments the bulk laminate 6 is only a layer of paper or paperboard.

Adhesive layers may be interposed between different layers described above.

For the various plastic laminate layers as well as the adhesive layers to connect laminate layers to the bulk layer 8, various materials can be used. For the purpose of outlining the examples and embodiments of the present invention, the following terms are used.

A "polyolefin" or "polyalkene" is a polymer produced from a simple olefin of the formula $C_nH_{2n}$ as a monomer.

A "polyethylene" is a polyolefin produced by polymerizing the monomer ethylene.

A "copolymer" or "heteropolymer" is a polymer of two or more monomeric species.

A "high density polyethylene" or "HDPE" is an ethylene polymer having a density of more than 0.941 g/cm$^3$.

A "low density polyethylene" or "LDPE" is a polyethylene homopolymer having a density from 0.910 to 0.935 g/cm$^3$.

LDPE is also known as branched or heterogeneously branched polyethylene because of the relatively large number of long chain branches extending from the main polymer backbone. LDPE has been commercially manufactured since the 1930s and is well known in the art.

A "linear low density polyethylene" (LLDPE) refers to a polyethylene copolymer having a density from 0.89 g/cm$^3$. LLDPE is linear and does not substantially contain long chain branching, and generally has a narrower molecular weight distribution than conventional LDPE. The traditional "linear low density polyethylene" can be produced with conventional Ziegler-Natta catalysts, vanadium catalysts. LLDPE has also been commercially manufactured for a long time (since the 1950s for solution reactors, and since the 1980s for gas phase reactors) and is also well known in the art.

A "mLLDPE" is a linear low density polyethylene produced by metallocene catalysts in gas phase reactors and/or with metallocene catalysts in slurry reactors and/or with any of the haftocene catalysts in solution reactors. The mLLDPE are well known in the art of packaging technology.

The one or more outer laminate layer(s) 7 are made of thermoplastic polymers and can comprise a polyolefin layer such as an outermost heat-sealable polyolefin layer in contact with the surroundings, for example LDPE or polypropylene. In an embodiment, the outer laminate layer(s) may provide additional protection and stability to the packaging container. Suitable polyolefins are polyethylene of the low density type, selected from the group consisting of LDPE, LLDPE, VLDPE, ULDPE or mLLDPE and blends of two or more thereof. Optionally other polyolefins such as high density polyethylene (HDPE), polypropylene or propylene co- or ter-polymers are useful as one or more outer laminate layer(s). The outer layer(s) may be applied by extrusion coating or other similar techniques. Optionally, the one or more outer plastic laminate layer(s) may be a pre-made film which is laminated to the bulk layer.

A suitable example of a polyethylene to be used as one of the outer layer(s) may be a LDPE of extrusion grade, for example having a LDPE having a melt flow index (as determined in accordance with ASTM D1238, 190° C./2.16 kg) of 4-15, such as 6-9, and a density (as determined in accordance with ISO 1183, method D) of 915-922 kg/m$^3$, such as 918-920 kg/m$^3$ The thickness of one or more of the outer layer(s) of the packaging material structure may be between 5 μm-50 μm, such as 7 μm-30 μm, such as 7 μm-20 μm, such as 8 μm-15 μm.

The one or more inner heat sealable layers 11, 12 of the packaging material 1 may contain a heat-sealable layer of a heat-sealable polyolefin polymer which is applied as a layer to be directed towards the inside of the container, i.e. in direct food contact. More particular, the heat-sealable layer for the inner laminate layer may suitably comprise a polyethylene polymer of the low density type, selected from the group consisting of LDPE, LLDPE, VLDPE, ULDPE or mLLDPE and blends of two or more thereof. Suitable examples to be used as inner plastic laminate layers and also as innermost layer may includes blends between LDPE and mLLDPE (e.g. 50/50, 40/60, 60/40, 30/70, 70/30, 20/80, 80/20 weight % blend ratios), such as LDPE of extrusion grade, for example having a melt flow index (as determined in accordance with ASTM D1238, 190° C./2.16 kg) of 2-12, such as 2-7, such as 2-5.5 and a density (as determined in accordance with ISO 1183, method D) of 914-922 kg/m$^3$, such as 915-920 kg/m$^3$. Examples of mLLDPEs suitable for use in aspects and embodiments described herein have a density less than 0.922 kg/cm$^3$ and a melt flow index (MFI) of 15-25 at 190° C. and 2.16 kg (ASTM 1278). Additional details are well known and within the capacity of the skilled person, additional understanding can be obtained for example in U.S. Pat. No. 6,974,612. The thickness of the innermost layer of the packaging material is between 5 μm-50 μm, such as 10 μm-30 μm, such as 15 μm-30 μm, such as 17 μm-25 μm.

EXAMPLES

The light transmission through a hole in a packaging material according to the present invention was compared with the light transmission through the carton layer and to a hole without barrier. The light barrier in the packaging material according to the present invention comprised a layer of 2 μm of 1:15 (carbon black/titanium dioxide 50% and binder and additives 50% dry weight to weight). The light transmission was measured by a spectrophotometer at a wavelength of 500 nm. The results clearly demonstrated that the tested light barrier in the packaging material according to the present invention was less prone to transmit light than the hole itself, 7% transmission compared to >80% for the hole. This transmission of 7% is similar to that of bleached board packages for portion packages 100 mL-250 mL. Thus, in a package according to the present invention, the hole provides a light barrier similar to the package itself.

The light transmission through a hole in a packaging material according to the present invention was compared with the light transmission through the carton layer and to a hole without barrier. The light barrier in the packaging material according to the present invention comprised a layer of 7 μm of 1:15 (carbon black/titanium dioxide 50% and binder and additives 50% dry weight to weight). The light transmission was measured by a spectrophotometer at a wavelength of 500 nm. The results clearly demonstrated that the tested light barrier in the packaging material according to the present invention was less prone to transmit light than the hole itself, <1% transmission compared to >80% for the hole. This transmission of <1 is in the range but slightly higher to that of board packages for portion packages 100 mL-250 mL. Thus, in a package according to the present invention, the hole provides light barrier properties in a similar range as the package itself. This is for packages for more sensitive goods.

The light transmission through a hole in a packaging material according to the present invention was compared with the light transmission through the carton layer and to a hole without barrier. The light barrier in the packaging material according to the present invention comprised a layer of 12 μm of 1:15 (carbon black/titanium dioxide 50% and binder and additives 50% dry weight to weight). The light transmission was measured by a spectrophotometer at a wavelength of 500 nm. The results clearly demonstrated that the tested light barrier in the packaging material according to the present invention was less prone to transmit light than the hole itself, <0.1% transmission compared to >80% for the hole. This transmission of <0.1% is in the range needed to pack light sensitive products. Thus, in a package according to the present invention, the hole provides light barrier properties in similar range as the package itself. This is for packages for the most sensitive goods.

REFERENCE LIST 1 packaging material
2 first layer of the packaging material
3 second layer of the packaging material
4 hole
5 layer of ink
5" first layer of ink
5" second layer of ink
6 bulk laminate ("bulk layer laminate")
7 outer laminate layer
8 carton layer and light barrier layer ("bulk layer")
9 bonding layer
10 gas barrier layer
11 sealing layer
12 inner plastic laminate layer
13 package

The invention claimed is:

1. A packaging material for packaging light-sensitive goods, said packaging material comprising:
   a first layer and a second layer, the second layer positioned beneath the first layer;
   at least one hole penetrating said first layer and extending to the second layer, the second layer extending across the entirety of the at least one hole below the first layer, and
   a light barrier, wherein said light barrier comprises a first layer of ink, essentially nontransparent to light, the first layer of ink provided directly on said second layer to at least partially fill said hole.

2. The packaging material according to claim 1, said packaging material comprising an inner side facing an inner package environment, and an outer side facing an outer package environment, wherein said first layer of ink is provided on said outer side.

3. The packaging material according to claim 1, wherein said first layer of ink comprises carbon black.

4. The packaging material according to claim 1, wherein the first layer of ink comprises titanium dioxide.

5. The packaging material according to claim 1, wherein said first layer of ink comprises carbon black and titanium dioxide.

6. The packaging material according to claim 5, wherein the weight ratio of carbon black to titanium dioxide is between 1:3 and 1:2000.

7. The packaging material according to claim 1, wherein said first layer of ink is at least 0.2 μm thick.

8. The packaging material according to claim 1, further comprising a second layer of ink.

9. The packaging material according to any one of preceding claims, wherein the packaging material does not contain a metal foil.

10. A package for packaging of light-sensitive goods, said package comprising a packaging material according to claim 1.

11. The packaging material according to claim 8, wherein the second layer of ink is positioned over the first layer of ink.

12. A method for providing a light barrier in the packaging material of claim 1,
comprising applying a first layer of ink directly on said second layer to at least partially fill said at least one hole, said first layer of ink essentially nontransparent to light.

13. The method according to claim 12, further comprising the step of applying a second layer of ink to said first layer of ink.

14. The method according to claim 13, wherein at least one of said layers of ink comprises carbon black and/or titanium dioxide.

15. The method according to claim 13, wherein at least one of said layers of ink is applied in a thickness of at least 0.2 μm.

16. The method according to claim 13, wherein at least one of said layers of ink is applied before or after the packaging material is processed into a package.

17. The method according to claim 16, wherein at least one of said layers of ink is applied before or after the package is filled.

* * * * *